United States Patent [19]

Mefferd

[11] 4,376,328
[45] Mar. 15, 1983

[54] METHOD OF CONSTRUCTING A GASEOUS LASER

[75] Inventor: Wayne S. Mefferd, Los Altos Hills, Calif.

[73] Assignee: Coherent, Inc., Palo Alto, Calif.

[21] Appl. No.: 259,912

[22] Filed: May 4, 1981

[51] Int. Cl.³ .............................................. H01S 3/00
[52] U.S. Cl. ...................................... 445/28; 228/212
[58] Field of Search ................. 29/25.13, 25.16, 464, 29/468; 228/212

[56] References Cited

U.S. PATENT DOCUMENTS

| | | | |
|---|---|---|---|
| 2,374,546 | 4/1945 | Laico | 29/25.16 X |
| 3,500,520 | 3/1970 | Oess | 29/25.16 |
| 3,501,714 | 3/1970 | Myers et al. | |
| 3,619,810 | 11/1971 | Mefferd | |
| 3,760,213 | 9/1973 | Buzzard | 313/39 |

FOREIGN PATENT DOCUMENTS 744776  7/1980  U.S.S.R. ............................. 29/25.16

Primary Examiner—Kenneth J. Ramsey
Attorney, Agent, or Firm—J. William Wigert, Jr.

[57] ABSTRACT

A method of making a gaseous laser is disclosed using a thin-walled, ceramic tube such as alumina. Heat conducting members are assembled and aligned in a spaced-apart relationship within the tube. Coaxially aligned cylindrical shields are affixed to the heat-conducting members to control gas pumping within the tube. Bore-defining aperatures in the heat-conducting members, or in sputter-resistant discs affixed to the heat-conducting members, are aligned by a mandrel under tension at which time the parts are permanently bonded within the tube.

14 Claims, 12 Drawing Figures

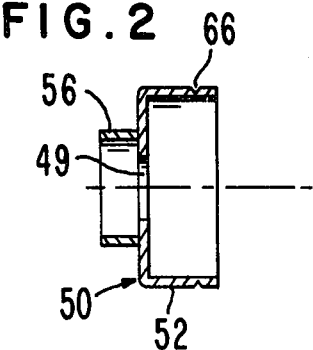
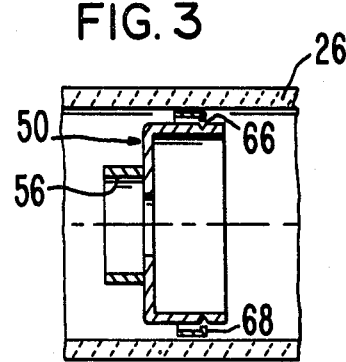
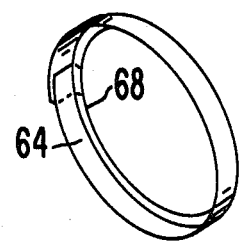
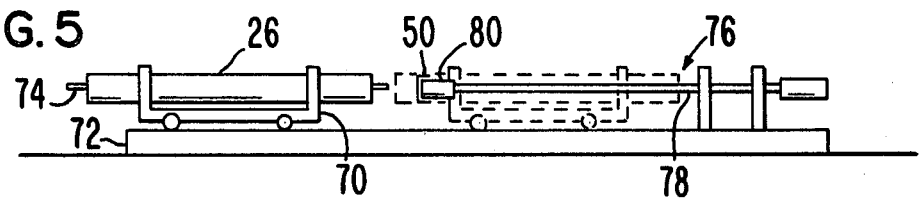
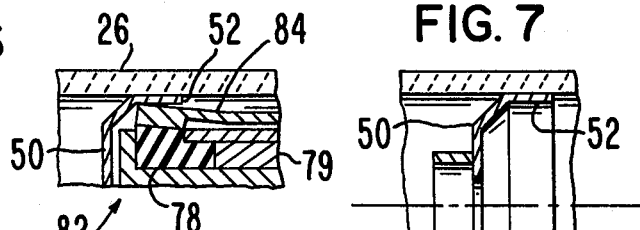
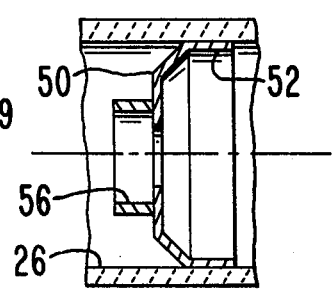
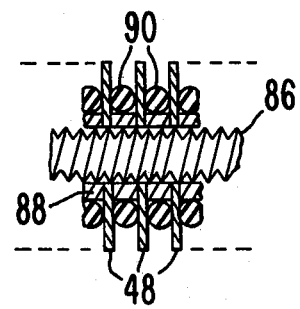
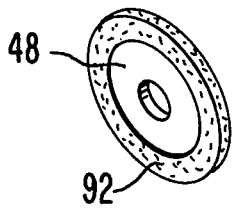
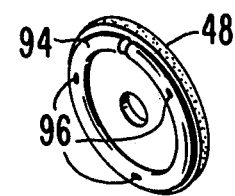
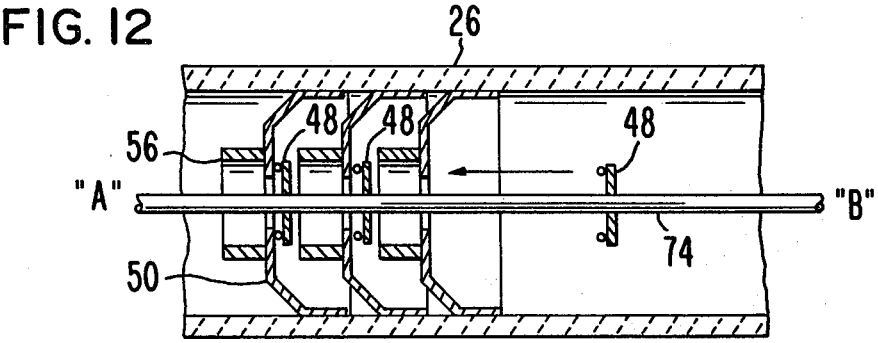

METHOD OF CONSTRUCTING A GASEOUS LASER

BACKGROUND OF THE INVENTION

The present invention relates to gas lasers and in particular to gaseous ion lasers having an improved laser discharge tube.

There are presently several varieties of commercially-available gas ion lasers. One type has a discharge tube which uses a plurality of graphite discs within a gas-confining glass tube. See for example U.S. Pat. No. 3,619,810. In another type, thick-walled beryllia (BeO or beryllium oxide) segments are bonded together to make a discharge bore. See for example U.S. Pat. No. 3,760,213.

Another type of discharge tube is described in U.S. Pat. No. 3,501,714. In this patent a thin-walled, precision, ceramic tube is used. One of the suggested ceramic materials is alumina ($Al_2O_3$ or aluminum oxide). Heat generated in the discharge is conducted out of the tube through a series of closely-spaced cylindrical sections which expand into contact with the ceramic tube when they are heated during operation of the tube.

This design has a number of advantages over the thick-walled BeO type discharge tube. In a BeO capillary tube with an inner bore diameter of about two millimeters and outer diameter of the order of one to one-and-a-half centimeters, the thermal heat flow through the beryllium oxide produces a tensile stress in the outer wall of the tube, which in a typical ion laser amounts to ten to fifteen percent of the breaking strength of the ceramic. Since alumina has about one seventh the thermal conductivity of beryllium oxide and since the stress is inversely proportional to thermal conductivity, the stress in an alumina capillary tube of the same dimensions could be sufficient to break the tube.

However, in a relatively thin walled tube (neglecting end effects) the circumferential and longitudinal stress tension in the outer layers is given by: $(\frac{1}{2}) \Delta t \alpha \epsilon / (1-\nu)$; where $\Delta t$ is the temperature gradiant across the tube wall; $\alpha$ is the linear coefficient of expansion of the material, $\epsilon$ is Young's modulus for the material; and $\nu$ is Poisson's ratio. If the alumina tube is made on the order of 1½ inches in diameter, the area available for heat flow substantially reduces $\Delta t$ so that the stresses can be reduced essentially in the ratio of the outer diameter of the tube.

Also, the alumina tube can be made with a thinner wall. The thick walls in the beryllium oxide tube are for structural rigidity and also because a large surface area is needed for water cooling. In the aluminum oxide tube the large outer diameter provides both structural rigidity and the area available for water cooling. The calculated stresses in an aluminum oxide tube of 1¼ to 1⅜ inches inside diameter and 1½ to 1⅝ inches outside diameter amount, at the same power flow through the tube, to ten to fifteen percent of the breaking strength of the aluminum oxide. Thus the thin-walled aluminum oxide tube is completely comparable to the beryllium oxide tube in its ability to conduct away the heat generated in the tube without producing a stress which is a large fraction of the tensile strength of the tube.

However, the laser tube described in U.S. Pat. No. 3,501,714 has many shortcomings both in design and fabrication. Many of these arise out of the use of a precision ceramic tube and high tolerance discs which are not permanently bonded to the wall of the tube.

U.S. Pat. No. 3,501,714 describes a gas laser tube that uses expansion of tightly toleranced discs, both in surface finish and in diameter to insure symmetric and uniform thermal coupling between the expanding discs and the ceramic tube wall. Besides making fabrication expensive and difficult, if these tolerances are not met the expansion of the inner disc combined with the asymmetric heat flow through the outer wall of the tube can lead to large tangential stresses exceeding the tensile strength of the ceramic tube. The tight tolerances that must be held limit the length of tube that may be machined. In the described laser, the discharge tube was less than 4" long even though the outer diameter of the tube was about 1.7".

Under symmetric radial heat flow conditions thermal stress in the ceramic tube wall is generated due to the fact that the inner wall is at a higher temperature than the outer wall. Hence it expands more producing a tangential tensile stress in the outer wall. Under the condition of symmetric radial heat flow the tangential tensile stress (and ceramic is weakest under tensile stress) in the outer wall is already approximately 20% of the tensile breaking stress of the ceramic. Even if extremely tight tolerances are maintained it is estimated that a condition of asymmetric heat flow could result and the tensile stresses in the outer ceramic tube would be a factor of 5 greater than the stresses that would be encountered in a situation of symmetric radial heat flow. This condition could easily lead to breakage of the tube.

Furthermore, the surface finish tolerances quoted (outside of the discs—16 RMS or better; surface finish on the inside wall of the alumina tube—32 RMS or better) limit the effective surface area available for heat flow through the tube walls.

The laser described in U.S. Pat. No. 3,501,714 depends upon the use of thick discs in order to maximize the surface area available for thermal transfer between the gas discharge and the outer ceramic tube envelope. This fact, and the poor thermal contact between the inner discs and the outer ceramic envelope contribute to a high impedance to gas flow within the laser in several ways. First, it is necessary to use a cylindrical channel through the thick discs for gas flow which creates a greater impedance to the gas flow. Secondly, the temperature of the discs is higher resulting in greater gas flow impedance.

SUMMARY OF THE PRESENT INVENTION

It is therefore an object of the invention to provide an improved gas laser.

Another object of the invention is to provide an improved method of making a gaseous discharge tube, particularly suitable for use in an ion laser.

Another object of the invention is to provide an ion laser having an improved gaseous discharge tube which is easily fabricated utilizing low tolerance parts.

Another object of the invention is to provide a method of fabricating a gaseous ion laser which is rugged and very reliable.

Another object of the invention is to provide a method of fabricating a gaseous ion laser having a discharge tube which is very effective in conducting heat away from the discharge path.

In accordance with the present invention a gaseous laser is constructed which includes forming a discharge tube using a thin-walled, comparatively low tolerance ceramic tube. Heat-conducting members, preferably cup-shaped, are assembled and aligned in a spaced-apart relationship within the ceramic tube. Preferably, cylindrical shields, which control gas pumping within the tube, are coaxially affixed to the cup members. Bore-defining apertures in the cup members or in discs made of sputter-resistant material, are aligned with a mandrel under tension. While under tension the parts are permanently bonded within and to the tube.

With this construction heat generated by the plasma discharge is conducted rapidly through the cup members and through the ceramic envelope. This rapid heat conduction is due to the intimate bond between the cup-shaped members and the ceramic tube. More specifically, the inner members are first deformed to match the ceramic tube regardless of roundness or surface finish irregularities in either part. The subsequent operation which, for example, can be brazing or soldering, provides a permanent metallic contact between the inner cup and the outer ceramic wall which leads to a high thermal conductivity between these two parts.

As a result of these fabrication techniques tolerance requirements on the inner and outer parts are drastically reduced. This in turn allows quite long structures to be built without the necessity of machining these parts. Preferably the cup members which support the bore defining discs are made out of thin-walled copper. This material yields and does not stress the ceramic under thermal expansion. Therefore the tight contact made by the brazing operation is achieved. It is not necessary to leave a space for thermal expansiion as in the design of the laser is U.S. Pat. No. 3,501,714.

Fabricating the laser discharge tube with thin-walled cup members has several advantages over the use of thick discs as in the laser of U.S. Pat. No. 3,501,714. The thin wall, as previously stated, allows easy deformation of the cup to match the inner diameter of the outer ceramic tube without regard to either roundness or surface tolerances. This in turn provides a uniform thin capillary space which is then uniformly wetted by the brazed solder material which makes the thermal joint between the cup and the ceramic tube. In combination with a low precision ceramic tube, a laser tube is provided which is relatively easy to fabricate.

Another feature of the laser fabrication is the anode. The anode is mounted in the same manner as the other internal discharge tube members. Thus heat generated by the anode is transmitted directly through the ceramic envelope by conduction. The anode is not in electrical contact with cooling water, eliminating electrolysis. The resistivity and mineral content of the water, thus, do not affect tube life.

BRIEF DESCRIPTION OF THE DRAWING

FIG. 2 is a cross sectional view of a cup-member and shield used in the laser of FIG. 1.

FIG. 3 is a partial cross sectional view of the cup-member of FIG. 2 shown within the ceramic tube during assembly.

FIG. 4 is a perspective view of the brazing shim shown in FIG. 3.

FIG. 5 is a plan view of an insertion/expansion tool used to assemble the improved laser of the present invention.

FIG. 6 is a partial, cross-sectional view of a part of the tool of FIG. 5.

FIG. 7 shows a cup member after insertion within the ceramic tube.

FIG. 8 shows an arrangement for fabricating the sputter resistant, bore-defining discs.

FIG. 9 is a perspective view of a disc prior to assembly.

FIG. 10 is a plan view of a brazing ring used to braze the disc of FIG. 9 to a cup member.

FIG. 11 shows the brazing ring of FIG. 10 spot-welded to the disc.

FIG. 12 illustrates assembly of the cups and discs within the discharge tube.

DESCRIPTION OF THE PREFERRED EMBODIMENTS

Figure 1:
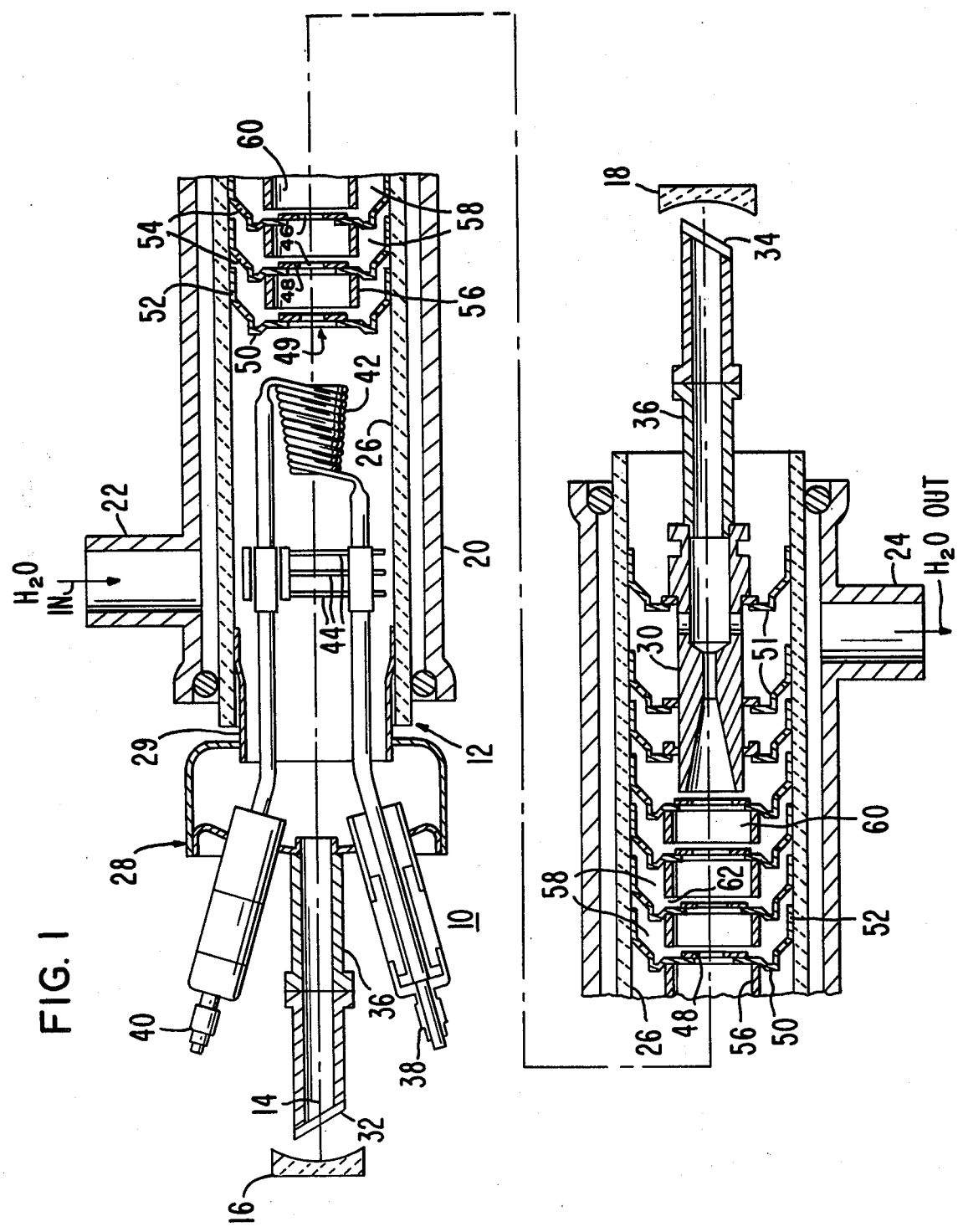
FIG. 1 is a dissected sectional view of an improved gaseous ion laser in accordance with the present invention.

FIG. 1 is a dissected sectional view of an improved gaseous ion laser 10 in accordance with the present invention. Laser 10 includes a discharge tube 12, filled with an active gas such as argon or krypton, having an axis 14 which is aligned with mirrors 16 and 18 (shown schematically) forming an optical cavity. A water jacket 20 (also shown schematically) surrounds the discharge tube 12. Water flows into the jacket at inlet 22, absorbs heat conducted out of tube 12, and passes out of exit 24. Not shown is a solenoid, which surrounds the water jacket, which confines the plasma discharge in the well-known manner.

Discharge tube 12 includes a thin-walled ceramic tube 26, a cathode assembly 28, an anode 30, and end window assemblies 32 and 34. The latter window assemblies are secured to nickel window support tubes 36 to the cathode assembly 28 and anode 30 respectively.

The cathode assembly 28 includes two lead connectors, 38 and 40 connected to a power supply (not shown) connected with a helical cathode 42. Heat shields 44 are provided to prevent radiation or sputtering from the cathode 42 from entering into the region near window 32.

The plasma discharge path and cross section is determined by apertures or bores 46 in a plurality of discs 48. Discs 48 are preferably made of a sputter-resistant material. In FIG. 1 only seven discs are shown since the entire discharge tube 12 is not illustrated. In one actual embodiment more than 50 such discs are employed.

Discs 48 are bonded to at the periphery of openings 49 in thin-walled cup-shaped members 50. These are made of a material, such as copper, which is an excellent heat conductor and which is malleable. The rims 52 of the cup members 50 are permanently bonded to the inside wall of ceramic tube 26. Gas return holes 54 are provided in the cup members 50. Heat generated by the plasma discharge is rapidly conducted through the discs 48 and cup members 50 to and through the tube wall 26 where the heat is carried away by the water coolant.

Coaxially attached or formed with each of the cup members 50 is a cylindrical ring or shield 56. These shields maintain the gas in regions 58 at a comparatively low temperature. Each cylinder 56 is cooled by thermal conduction through cup 50 to tube wall 26. Without cylinder 56, the gas in region 58 is heated by thermal conduction from the discharge. If this happens a lesser number of gas atoms is stored within the tube and a longer time is required after switch-on for the tube to reach equilibrium, since gas would have to move through the gas return holes 54 to the anode and cathode regions before the proper operating pressure was established in the region of the discharge. With cylinder 56 in place, gas need only move from region 60 to region 58 to establish equilibrium operating conditions.

Gas pumping may take place by acceleration of the ions through the gas return holes 54 under the influence of the electric field in the vicinity of these holes. Cylinder 56 minimizes the number of ions in region 58 by providing a surface for recombination 56 and only a small channel 62 through which ions may migrate into region 58.

It is well known to those skilled in the art that when a low pressure discharge takes place in a continuous bore, such that all ions within the discharge are in free-fall to the bore walls (theoretically described as the Langmuir-Tonks Model), then gas pumping at low currents is toward the anode and at higher currents toward the cathode. When the confining structure is in a region with no near walls, pumping is always toward the cathode. Thus, by properly choosing the diameter of cylinder 56, it is possible, at the maximum discharge current for which the device is designed, to provide no net pumping. This is an important consideration in longer ion lasers in which it is difficult to provide sufficient bypass in an internal gas return of the normal type.

Since the direction of gas pumping by the discharge can be controlled by the bore and shield 56 configuration and diameter, the tube can be configured to vary for different sections along the tube. Thus, for example, one can have anode pumping in one region and cathode pumping in another. This would then provide a pressure gradient within the tube in order to minimize growth of plasma oscillations while still providing an overall zero or small pressure differential.

If the gas return holes 54 are enlarged much beyond a diameter somewhat less than the bore diameter, the discharge may also travel through the gas return holes. If, however, the diameters and/or positions are varied then the discharge would probably not pass through the bypass holes. This is because to do so would require a rather tortuous path through the structure. This tortuous path would also include sections where the discharge was travelling transverse to the magnetic field rather than parallel to it. This would tend to drive the discharge into the wall and raise the discharge potential per unit length.

Alumina tubes 26 are available from manufacturers such as "COORS" and from "McDANIELS" and are standard items having 1.50" O.D. and a 0.125" wall thickness. Tolerances on the inside cylinder are approximately ±0.05" on the I.D. and 0.06" to 0.12" inch straightness. While it would be straightforward to fabricate a bore tube as shown in FIG. 1 using standard self-jigging and auxiliary jigging techniques combined with serial brazing, the large tolerances on I.D. and straightness preclude their use.

It is apparent that ceramic tube having small tolerances on inside diameter and straightness would be very expensive. The following techniques can be used to fabricate the ion laser bore tube to FIG. 1 using available "standard toleranced" ceramic tubes.

The copper cup members 50 are formed from OFHC copper sheet by "drawing" as shown in FIG. 2. Afterwards the shield 56 is bonded, such as by brazing, to the cup 50.

A brazing shim 64 (FIG. 4) is placed between the copper cup 50 and ceramic tube 26 as shown in FIG. 3. One suitable brazing material "Ticusil." This material is a copper-silver eutectic with a small percentage of titanium added which has been used in the past for making ceramic to metal seals under what is known as the active metal process. In this process the titanium reduces the ceramic material to allow a ceramic-to-metal seal in one operation. This obviates the necessity of prior metalization of the ceramic through, for example, the well-known molymanganese or other processes.

It has been found desirable to provide a circumferentially extending grove 66 around the surface of the cup 50 rim. This grove accepts a lip 68 formed in the brazing shim. The purpose of the lip/grove combination is to prevent slippage of the shim during the brazing operation. This insures a clean copper/ceramic contact at the very edge of the cup rim.

FIGS. 5-7 illustrate how the individual cup members 50 are expanded against the inside wall of ceramic tube 26 to form a secure mechanical fit prior to brazing. The ceramic tube 26 is supported on a carriage 70 which can be moved in a parallel fashion along rail 72. Within the tube 26 is a floating mandrel 74. Fixed parallel to the rail 72 is an expansion tool 76 which comprises an elongated portion 78 and an expansion head 80. A copper cup 50 is first inserted over the expansion head 80. Then carriage 70 is moved toward expansion tool 76 as indicated by the dotted representation centering the cup 50 within the tube 26.

Suitable means, such as a hydraulic pump (not shown) drives a piston 79 which compresses an elastomer ring (FIG. 6), otherwise confined, outwardly against a plurality of fingers 84 circumferentially located within the cup member 50. These fingers deform and force the rim 52 firmly in contact with the ceramic tube 26. In this position (FIG. 7), it is ready for a later brazing operation.

The copper cups 50 are annealed prior to insertion within the tube 26 to minimize the force required to expand them and to allow them to be better forced into conformance with the ceramic tube 26. This is desirable because of the slightly out-of-round inside diameter of the tube.

Plating of discs 48 prior to brazing is now described. First, tungsten discs 48 are threaded onto a mandrel 86 spaced by metal spacers 88 inside O-rings 90 (FIG. 8). This assembly is then nickel plated, 0.0005"-0.0010" thick. The O-rings 90 mask the inside areas of the discs and the metal spacers 88 provide electrical contact to the discs. Masking prevents subsequent wetting of the surface by the brazing material. A fabricated disc, having a nickel-coated outer area 92, is illustrated in FIG. 9.

After plating, the discs 48 are fired at 900° C. for 10 minutes in hydrogen. This anneals the nickel plating and improves the nickel-tungsten bond. A braze ring 94, as shown in FIG. 10, is then formed from 0.030 dia Nicusil-3 wire, available from Western Gold and Platinum Co. The braze ring is next spot welded at 96 to one face of a tungsten disc 48 as shown in FIG. 11.

The tube assembly sequence is now explained. First, a cup 50 is placed on the expansion tool 76 and the tool expanded enough to hold the cup 50 in place. The braze foil ring 64 is placed around the cup 50 and the carriage/tube is moved until the cup is at the proper location inside the tube 26. The tungsten mandrel 74 floats freely inside the tube 26 and moves along with it on the carriage 70, slipping in and out of the hole in expansion tool. The cup 50 is then expanded, the pressure on elastomer 78 relieved, and then the carriage/tube moved of the expansion tool. A tungsten disc/braze ring assembly is then slipped over the mandrel as shown in FIG. 12.

The process is then repeated, alternately installing a cup 50 and a disc 48, until the bore is complete.

In actual practice the first and last tungsten discs 48 which match the mandrel diameter can be previously brazed to their respective copper cups 50 using a higher temperature brazing alloy. These two discs then establish the bore centerline.

Prior to brazing, the tube/bore assembly with mandrel is placed vertically in a vacuum oven with end "B" (FIG. 12) upward. The mandrel 74 is secured at one end and stretched taut by pulling on the opposite end throughout the brazing cycle. This insures that all intermediate discs 48 are aligned to form a straight bore after brazing.

A "transition" section, consisting of one or more sections having progressively larger disc hole 49 sizes, is provided at one or both ends. In this case the first and last "mandrel size" discs and all larger size discs outward from these are pre-brazed.

As the assembly is heated the copper tends to expand more than the ceramic because of the difference in their thermal expansion coefficients. This results in the cups 50 being very tightly fitted in the tube 26 when brazing temperature is reached. The copper becomes fully annealed at brazing temperature which is desirable so that it can yield to the strain set up by differential thermal expansion during cooling and not pull away from the ceramic at the brazed joint.

The process of aligning these "floating" discs on a taut straight mandrel is very important to being able to fabricate very straight bores within low tolerance ceramic tubes. "Very straight bores" may be taken as those with overall straightness of less than 10% of the bore diameter.

The cathode assembly 28 is encased in a copper enclosure 29 which must form an air-tight seal with tube 26. The same expansion/brazing technique is used to form this connection. On the interior of the tube, the braze is required for good heat conductivity between the cup and the tube wall. On the ends, where a vacuum tight joint is also required, after expansion, the cup may be pressed into even more intimate contact with the wall, with a chisel-shaped tool so that the cup will conform to the same irregularities of the tube wall. This results in a better vacuum seal.

The same fabrication technique is used to mount the anode 30. The resulting configuration provides important advantages. The anode 30 is mounted by copper cups 51 similar in design to cups 50. As a result, heat generated by the anode is connected out of the tube through the cups 51. Thus, the anodes are cooled without any electrical contact with the coolant water. The anode is electrically isolated from the rest of the tube avoiding the use of insulating varnish as in U.S. Pat. No. 3,501,714, between the anode and the tube 26. Also, a lead wire (not shown) can be brought directly out of the tube without having to go through the tube 26 wall.

Another technique for providing high sputter-resistant material is to vapor deposit tungsten onto the central region of the copper cups 50 by well known techniques. In this case, of course, there is not the same flexibility of having the tungsten discs 48 slide around to center themselves on the mandrel. However a straight bore can still be achieved by using the insertion tool 76 with a small pin to hold the tungsten in the center of the tube as determined by an external insertion machine reference. Then the copper cups are expanded to the walls of the tube so that the copper cup rims conform to the tube wall while keeping the tungsten-plated center portion of the copper aligned.

Another technique for attaching the copper cups 50 to the alumina is as follows. When one is expanded into contact with the alumina tube 26 wall, which has been premetalized with Mo Mn or other techniques, the copper cups can be pulse-soldered in place by means of a pulsed induction heating apparatus which heats the cups 50 and the circumferential metalization of the ceramic and thus melts the solder. The cooling of the alumina wall after the pulses terminate cools the solder below its melting point so that the tool can be withdrawn immediately with the copper cup soldered in place. This technique is desirable if permanent magnets are used inside a tube, since it is a method of attaching the copper cups at low temperature where the magnet does not de-magnetize.

Since the tube operates at relatively low temperature, the interuption of water cooling does not result in boiling of the water remaining in the cooling jacket. Calculation shows that the stored heat in the tube is insufficient to even raise the bore tube 26 to the boiling point of water. Air-cooled tubes are also feasible with this laser design. Cooling fins are attached directly to the external surface of the alumina tube 26.

In one actual embodiment, the following dimensions were used:

| | | |
|---|---|---|
| cup 50 | thickness | .030" |
| | dia. of opening 49 | .31" |
| | O.D. | 1.125" |
| brazing ring 64 | thickness | .002" |
| disc 48 | bore 46 dia. | .110" |
| | O.D. | .50" |
| | thickness | .010" |
| shield 56 | O.D. | ¾" |
| | I.D. | ⅝" |

What is claimed is:

1. A method of fabricating a gaseous laser discharge tube comprising:
    assemblying a plurality of spaced-apart heat-conducting members, each having a discharge defining central aperture generally aligned with the tube axis, within and in contact with an electrically-insulating tube;
    tensioning a mandrel provided through the central apertures to bring the central apertures into exact alignment; and
    permanently securing the heat-conducting members to the electrically-insulating tube.

2. The method of claim 1 wherein said securing step comprises brazing the heat-conducting members to the electrically-insulating tube.

3. The method of claim 2 wherein the assembly step includes the additional step of inserting brazing material between the heat-conducting members and the electrically-insulating tube prior to brazing.

4. The method of claim 3 wherein the brazing step is accomplished by baking the entire tube assembly while the mandrel is in tension.

5. The method of claim 4 wherein the baking step occurs with the mandrel vertically oriented.

6. The method of claim 2 wherein the assembly step includes the steps of:
    (a) forming cup-shaped members of a heat-conducting material;

(b) inserting the cup-shaped members spaced-apart within the tube;

(c) inserting brazing material between the cup-shaped members and the tube wall; and (d) expanding the cup rim into the interior wall of the tube to hold the cup-shaped members in place.

7. The method of claim 6 including the additional step of inserting discs of heat-resistant material having a bore-defining central aperture therein, within and in contact with each of the cup-shaped members.

8. The method of claim 6 wherein a brazing material is provided between the discs and the cup-shaped members.

9. The method of claim 8 wherein at least two cup-shaped members have discs bonded therein before inserting them within the tube to define a bore center line.

10. The method of claim 6 wherein the assembly step additionally includes forming a cylindrical shield ring coaxially as part of each of said cup-shaped members.

11. The method of claim 2 wherein the heat-conducting members are annealed before assemblying within the tube.

12. The method of claim 1 including the step of terminating one end of the laser tube with a cathode assembly and the other end with an anode.

13. The method of claim 12 wherein said anode is affixed within the tube by attaching it to the tube wall by additional heat-conducting members.

14. The method of claim 1 including the step of surrounding each of the central apertures with a sputter-resistant material.

* * * * *